(12) United States Patent
Montagano

(10) Patent No.: US 10,757,868 B2
(45) Date of Patent: ***Sep. 1, 2020

(54) PLANT SUPPORT FRAME AND METHOD AND KIT FOR MAKING SAME

(71) Applicant: Mondi Products Ltd., Vancouver (CA)

(72) Inventor: Michael Montagano, Vancouver (CA)

(73) Assignee: MONDI PRODUCTS LTD., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/717,735

(22) Filed: Sep. 27, 2017

(65) Prior Publication Data

US 2018/0014474 A1 Jan. 18, 2018

Related U.S. Application Data

(62) Division of application No. 14/470,105, filed on Aug. 27, 2014, now Pat. No. 9,801,347.

(60) Provisional application No. 61/871,524, filed on Aug. 29, 2013.

(51) Int. Cl.
*A01G 9/12* (2006.01)

(52) U.S. Cl.
CPC ............... *A01G 9/12* (2013.01); *A01G 9/124* (2013.01); *Y10T 29/49947* (2015.01)

(58) Field of Classification Search
CPC .......... A01G 9/12; A01G 9/122; A01G 9/124; A01G 13/0237; A01G 17/04; A01G 17/06; A01G 17/14
See application file for complete search history.

(56) References Cited

U.S. PATENT DOCUMENTS

| | | | |
|---|---|---|---|
| 764,472 A | 7/1904 | Kessler | |
| 1,617,494 A | 2/1927 | Nuckols | |
| 3,166,869 A | 1/1965 | Luper | |
| 3,264,783 A * | 8/1966 | Bayliss | A01G 9/12 108/190 |
| 4,322,911 A * | 4/1982 | Bach | A01G 17/06 256/1 |
| 5,048,231 A | 9/1991 | Brown | |
| 5,966,867 A | 10/1999 | Downer et al. | |
| 6,145,246 A | 11/2000 | Galbraith | |

(Continued)

FOREIGN PATENT DOCUMENTS

CA 2096865 11/1994

*Primary Examiner* — Lisa L Tsang
(74) *Attorney, Agent, or Firm* — Benoit & Cote, Inc.; Ibrahim Tamer

(57) ABSTRACT

In one series of embodiments there is provided a bracing member for a plant support frame. In embodiments the bracing member comprises a body portion defining a perimeter; an opening provided within the body portion which is sized and dimensioned to receive a plant there through; and a plurality of radially oriented circumferential holes extending through the body portion. The holes being sized to accept a cooperating fastener for securing a support rod to the bracing member for forming the plant support frame. The different bracing members of a plant support frame are dimensioned for storage in a flat concentric arrangement whereby the circumferential holes of an inner bracing member align with the circumferential holes of an outer bracing member for receiving a locking pin there through for securing different bracing members together.

17 Claims, 5 Drawing Sheets

(56) References Cited

U.S. PATENT DOCUMENTS

| | | |
|---|---|---|
| 6,964,126 B1 | 11/2005 | Anderson |
| 7,188,448 B2 | 3/2007 | Sedlacek |
| 7,735,259 B2 | 6/2010 | Rich et al. |
| D624,330 S * | 9/2010 | Wing .............................. D6/405 |
| 8,196,344 B1 | 6/2012 | Roberts et al. |
| 2002/0104261 A1* | 8/2002 | Shulman .................. A01G 9/12 47/47 |
| 2005/0039394 A1 | 2/2005 | Kelly |
| 2008/0028677 A1* | 2/2008 | Shelton .................... A01G 9/12 47/46 |
| 2011/0232176 A1 | 9/2011 | Davis et al. |

\* cited by examiner

US 10,757,868 B2

PLANT SUPPORT FRAME AND METHOD AND KIT FOR MAKING SAME

BACKGROUND

1. Field of the Invention

The subject matter disclosed generally relates to a support frame for plants and methods for making same.

2. Related Publications

A variety of plant support structures are known in the art.

U.S. Pat. No. 7,735,259, issued Jun. 15, 2010, discloses stakes and cross braces attached to each other by means of clamps.

US Patent Application Publication No. 2005/0039394 discloses a plant support structure comprising stakes, hoops and clamps.

SUMMARY

In a first embodiment there is disclosed a plant support frame comprising first and second bracing members and first and second support rods.

In alternative embodiments the frame further comprises:
a) a third bracing member; and
b) a plurality of support rods.

In embodiments each of the first, second and third bracing members have different diameters.

In embodiments the bracing members are secured to the rods by fasteners selected from the group consisting of clips, clamps, screw clamps, and U-bolts.

In embodiments the fastener is a screw clamp mounted on the bracing member and comprises a gripping surface able to adopt an angle of between about 5 degrees and about 85 degrees to the plane of the bracing member.

In embodiments at least one the bracing member comprises an optionally removable segment.

In a further series of embodiments there is disclosed a kit for a plant support frame, the kit comprising at least first and second bracing members.

In embodiments the kit further comprises a plurality of fasteners for fastening the bracing members to suitably sized cooperating support rods.

In embodiments at least one of the bracing members comprises a removable segment.

In embodiments the kit comprises a least one anchor pin and at least one the bracing member comprises a plurality of radial holes sized to accept insertion of the at least one anchor pin.

In embodiments the kit further comprises a plurality of support rods.

In yet a further series of embodiments there is disclosed a bracing member for forming, together with suitable support rods, a plant support frame, the bracing member comprising a plurality of openings, the individual the openings sized to accept a cooperating fastener for securing the bracing member to a support rod.

In embodiments the bracing member comprises a removable segment.

In embodiments the bracing member comprises the fastener.

In embodiments the fastener is selected from the group consisting of a clamp, clip, screw clamp and U-bolt.

In embodiments the fastener is a screw clamp and the screw clamp comprises at least one gripping surface able to adopt an angle of between about 5 degrees and 85 degrees to the plane of the bracing member.

In embodiments the bracing member further comprises a plurality of radially oriented circumferential holes.

In yet a further series of embodiments there is disclosed a plant support frame comprising at least first, second and third bracing members, at least two support rods, and a plurality of fasteners for optionally fastening the at least first, second and third bracing members to the rods to form the frame; In further embodiments the frame comprises at least three support rods, and wherein when the frame is disassembled, the first the bracing member will fit within the second the bracing member and the second the bracing member will fit inside the third the bracing member to form a substantially concentric arrangement of the bracing members.

In embodiments the bracing members are adapted to be mutually secured in the concentric arrangement.

In embodiments the fasteners are selected from the group consisting of clips, clamps, screw clamps and U-bolts.

In yet a further series of embodiments there is disclosed a method for forming a plant support frame, the method comprising the step of providing at least three bracing members suitable for assembly with at least one cooperating supporting rods.

In embodiments the bracing members are of different diameters and the resulting frame is tapered.

In embodiments the method comprises fastening the bracing members to the supporting rods.

In embodiments each of the bracing members comprises a fastener for securing the bracing member to a supporting rod.

In embodiments the fastener is selected from the group consisting of clips, clamps, screw clamps and U-bolts.

In yet a further series of embodiments there is disclosed a bracing bar for forming a plant support frame, the bar comprising at least two end fastener positions for securing the bar to at least two cooperating support rods.

In embodiments the end fastener positions comprise or are adapted to cooperate with a fastener selected from the group consisting of clips, clamps, screw clamps and U-bolts.

In embodiments a bracing member comprises a hole for accepting a cooperating support rod.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive, and the full scope of the subject matter is set forth in the claims.

DETAILED DESCRIPTION OF SELECTED EMBODIMENTS

Definitions

Figure 1:
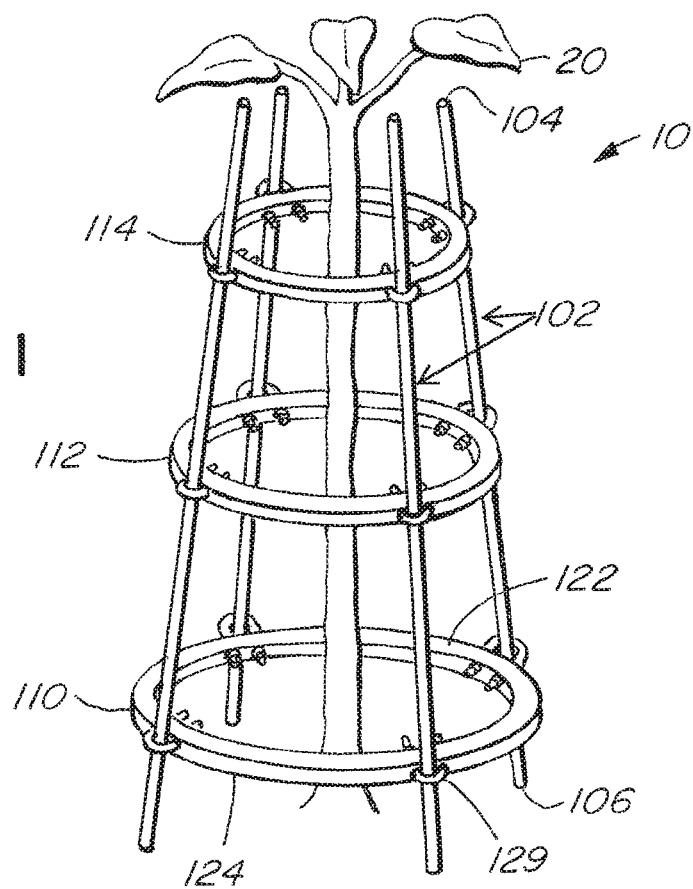
FIG. 1 is a support frame according to a first embodiment.
Figure 2:
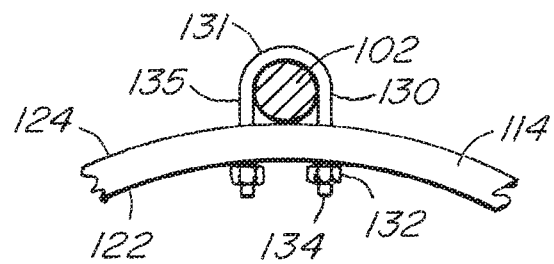
FIG. 2 shows detail of the attachment between bracing members and support rods according to the embodiment of FIG. 1.

In this disclosure, the word "comprising" is used in a non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements. Thus the statement that a structure comprises two specified elements includes the possibility that the structure includes two, three, four or more such specified elements.

In this disclosure the recitation of numerical ranges by endpoints includes all numbers subsumed within that range including all whole numbers, all integers and all fractional intermediates (e.g., 1 to 5 includes 1, 1.5, 2, 2.75, 3, 3.80, 4, and 5 etc.).

In this disclosure the singular forms a "an", and "the" include plural referents unless the content clearly dictates otherwise. Thus, for example, reference to a composition containing "a compound" includes a mixture of two or more compounds.

In this disclosure term "or" is generally employed in its sense including "and/or" unless the content clearly dictates otherwise.

In this disclosure the term "plants" is not limiting and while in one embodiment the frames and support frames disclosed herein are suitable to support tomato plants, it is not intended that the use of the support frame be limited to tomato plants or to any specific plant types. In embodiments, the support frames, bracing members, bracing rods and frames hereof are used with or for all manner and variety of plants, shrubs, small trees and the like, and those skilled in the art will readily identify and implement suitable adaptations for use with particular plant types. Without limitation frames according to embodiments are suitable to support all manner of climbing and fruit bearing plants and plants requiring additional support for their growth and by way of example and not limitation frames according to embodiments are suitable for use with all manner of climbing plants such as peas, snap peas, snow peas, fruit bearing plants such as fruit trees, such as orange, lemon, apple, pear, peach, cherry, flowering plants such as those with heavy flowers such as peonies, and sunflowers, and vines such as grape, tomato, cucumber. Further non limiting examples of particular plant types with which embodiments are useable include beans, tomatoes, cucumbers, melons, pumpkins, roses, lilies, peonies, clematis, morning glory, wisteria and sunflower.

In this disclosure, the terms "support rod" or "support pole" or "rod" or "pole" are used interchangeably and mean any substantially elongated structure that is or can be used in combination with bracing members or bracing bars according to embodiments to form a support frame or frame structure. In particular embodiments, support rods include, but are not limited to, stakes commonly used in gardening, and in alternative embodiments is or may comprise any elongate rod, stick, stake, pole, cane or support and may include wooden stakes, rebar, bamboo sticks, canes, metal rods and the like. In embodiments the support rods may comprise two or more segments. In alternative embodiments, support rods may consist of or comprise any material and may be of any suitable materials, lengths and diameters.

Figure 10:
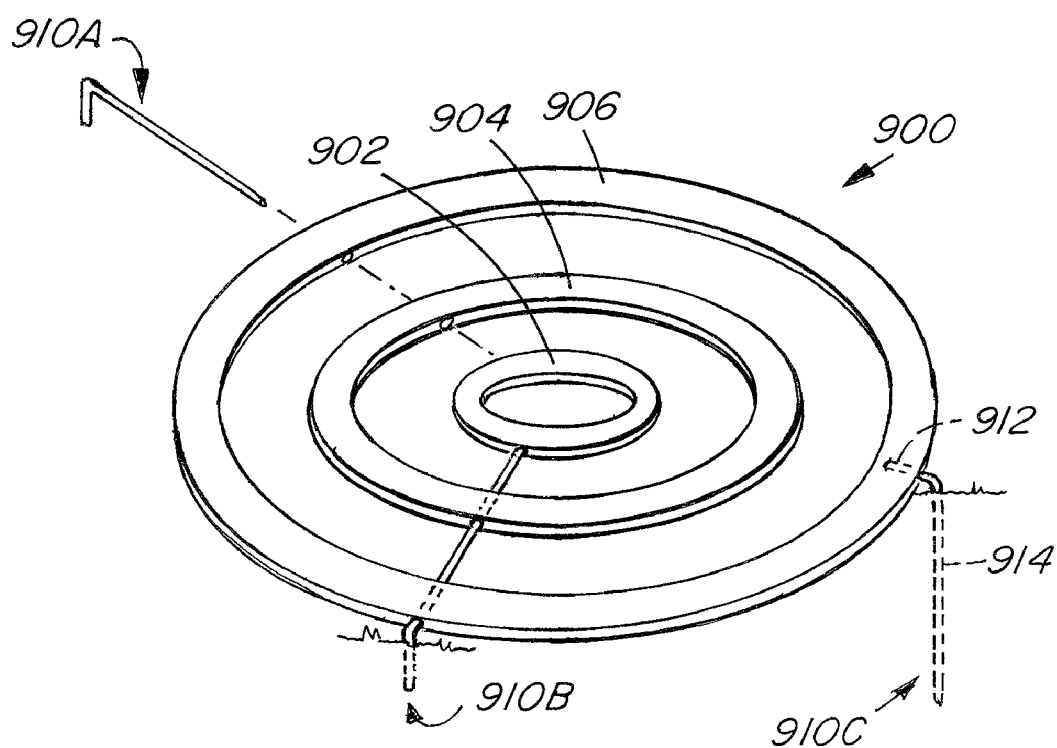
FIG. 10 shows the storage of bracing members according to an embodiment.

In this disclosure the term "anchor pin" means a pin used to secure two structures against relative movement. In embodiments and anchor pin is suitable to hold a bracing member or frame relative to a substrate, acting as a peg to peg the bracing member or frame to the ground. In embodiments an anchor pin is useable to insert radially through a plurality of bracing members to hold them together for easy storage and transportation. In embodiments an anchor pin serves both of the foregoing functions. An embodiment of the foregoing uses of an anchor pin is generally illustrated in FIG. 10.

In this disclosure, the term "support rod fastener" or "fastener" means an assembly for securing a bracing member or a bracing bar or cross bar or crosspiece to a cooperating support rod and in embodiments such fasteners are located at varying distances around the perimeter of one or more bracing members. In embodiments fasteners are proximate the inner or outer face or edge or surface of a bracing member or is mounted on or in a bracing bar. In embodiments, a fastener is optionally detachable from the bracing member or bracing bar. In embodiments a fastener is adjustable so that it can engage support rods of varying materials and diameters and in embodiments is optionally removable or securable to a bracing member. It will be understood that in some embodiments a bracing member and fastener will be adapted to permit them to be optionally mutually secured. A fastener is to be understood to have broad scope and in particular embodiments means and includes any suitable device, mechanism or structure that is used for fastening, bracing, attaching or securing support rods to suitable cooperating bracing members. In embodiments, fasteners may comprise, but are not limited to, clips, Velcro tape, wire, rope, elastic band, screws, bolts, U-bolts, staples, adhesives, hook and eye arrangements and all manner of other engaging means, all of which will be readily recognised by those skilled in the art. It will be understood that where the fastener comprises a U-bolt then one of the rod or the bracing member will be enclosed by the closed end of the U. It will be further understood that in embodiments where the fastener is a simple or straight bolt then both the bracing member and rod will comprise a suitably sized and mutually alignable hole allowing the bolt to be inserted therethrough. In embodiments a bolt may be secured in place using suitable nuts such as wingnuts. In one series of embodiments, the support rod fastener comprises an adjustable grip or clamp. In embodiments a fastener comprises a cover piece and comprises an Allen Key screw or other equivalent structure for adjusting the clamp. In the foregoing embodiments when a support rod is inserted into the support rod fastener, the Allen Key screw or equivalent structure is turned to close the clamp around the rod thereby securing the bracing member to the rod. It will be understood that in embodiments the clamp may be actuated using a screwdriver, a suitable handle or nut, or any other suitable method or structure, all of which will be recognised and implemented by those skilled in the art.

It will be understood that in embodiments hereof a fastener is reversible. In other words, a fastener may be reversibly locked and unlocked so that a bracing member and rod may be joined and released as desired by a user, so that a frame can be assembled and disassembled or modified as desired from time to time.

Figure 8:
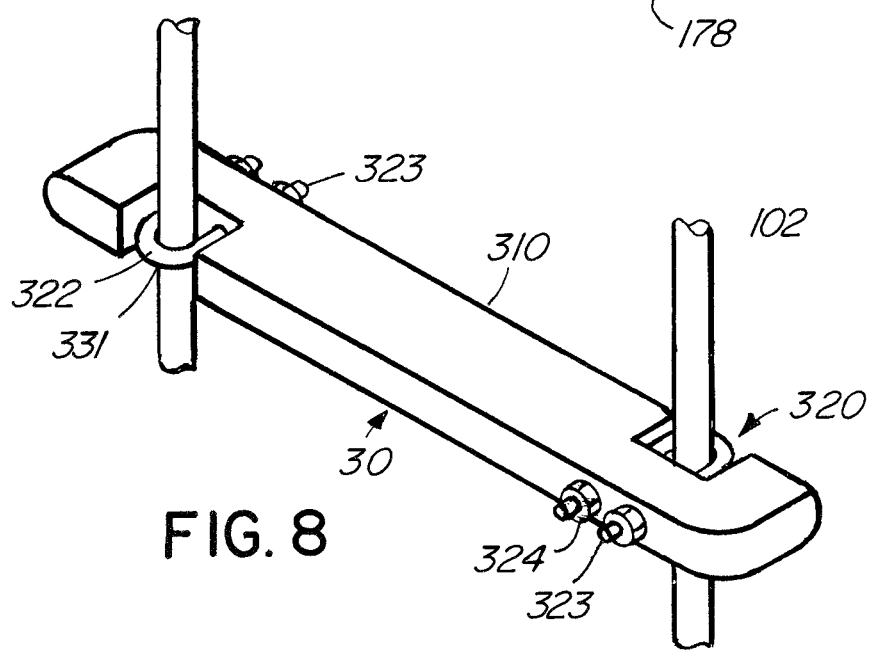
FIG. 8 shows a straight crossbar according to a variant embodiment.

In this disclosure the term "cross bar" or "crossbar" or "bracing bar" refers to a rigid structure which is engaged with a plurality of support rods to thereby form a supporting frame. In embodiments crossbars have two free ends, and are adapted to carry optionally removable support rod securing assemblies. FIG. 8 shows an example of a bracing bar or crossbar according to an embodiment. It will be appreciated by those skilled in the art that cross bars according to alternative embodiments alternatively comprise one, two, three or more arms or ends and are optionally in the shape of an X, Y, Z or other suitable shape and that all manner of shapes may be combined and that those skilled in the art will make suitable choices of shape, size and configuration for a wide range of applications. Thus the shapes and illustrations presented herein are illustrative and are in no way limiting of the configurations of bars, bracing members, support frames, frames and geometries that will be readily implemented by those skilled in the art. In particular embodiments a user may interlink structures to provide different geometries of support frames as may be desired.

In this disclosure the terms "bracing member" also alternatively referred to as a "bracing ring" or "bracing hoop" or "crosspiece" mean a substantially rigid structure which may be engaged with a plurality of cooperating support rods to collectively form a support frame. In embodiments a bracing member includes one or more optionally removable segments and in embodiment a bracing member is adapted so that the removable segment or segments is optionally resecurable as part of the bracing member. In embodiments a removable segment may in fact be hinged or moveably attached to the remaining portion of the bracing member at one end so that it can be rotated about the hinge or is otherwise flexed or displaced to create a user defined opening in the bracing member perimeter. Thus it will be understood that in embodiments a statement that a segment of a bracing member is removable and similar statements include the possibility that in embodiments the segment is displaced while retaining some attachment to the remaining portion of the bracing member. In alternative embodiments, bracing members may have diameters of any suitable size and in particular embodiments a bracing member has a diameter of up to or less than about 10 cm, 15 cm, 20, 25, 30, 35, 40, 45, 50, 55, 60, 65, 70, 75, 80, 85, 90, 95, 100, 150, 200, 250, 300, 350 or 400 cm or more than 400 cm. In general bracing members have any desirable diameter or diameters, which will be readily understood and chosen amongst by those skilled in the art who will also select suitable materials to make the bracing members, and will select and implement suitable fasteners. In embodiments a bracing member comprises one or more holes or openings sized to accept the insertion therethrough or thereinto of a cooperating support rod, and in embodiments the mutual sizing of the support rod and cooperating hole is such that there is a frictional engagement between the two. In alternative embodiments the rod or the rod end is adapted to screw or clip into the suitably adapted cooperating hole. In embodiments the holes comprise fasteners. In embodiments bracing members are sized in feet and inches rather than in metric measures, and thus in embodiments bracing members have a diameter of up to, or more than, or less than, about 4, 5, 6, 7, 8, 9, 10, 11 or 12 inches or up to, or more than, or less than, about 1, 2, 3, 4, 5, 6 or more feet. Those skilled in the art will understand that frames may be adjusted to larger or smaller sizes as desired by a user.

Figure 10A:
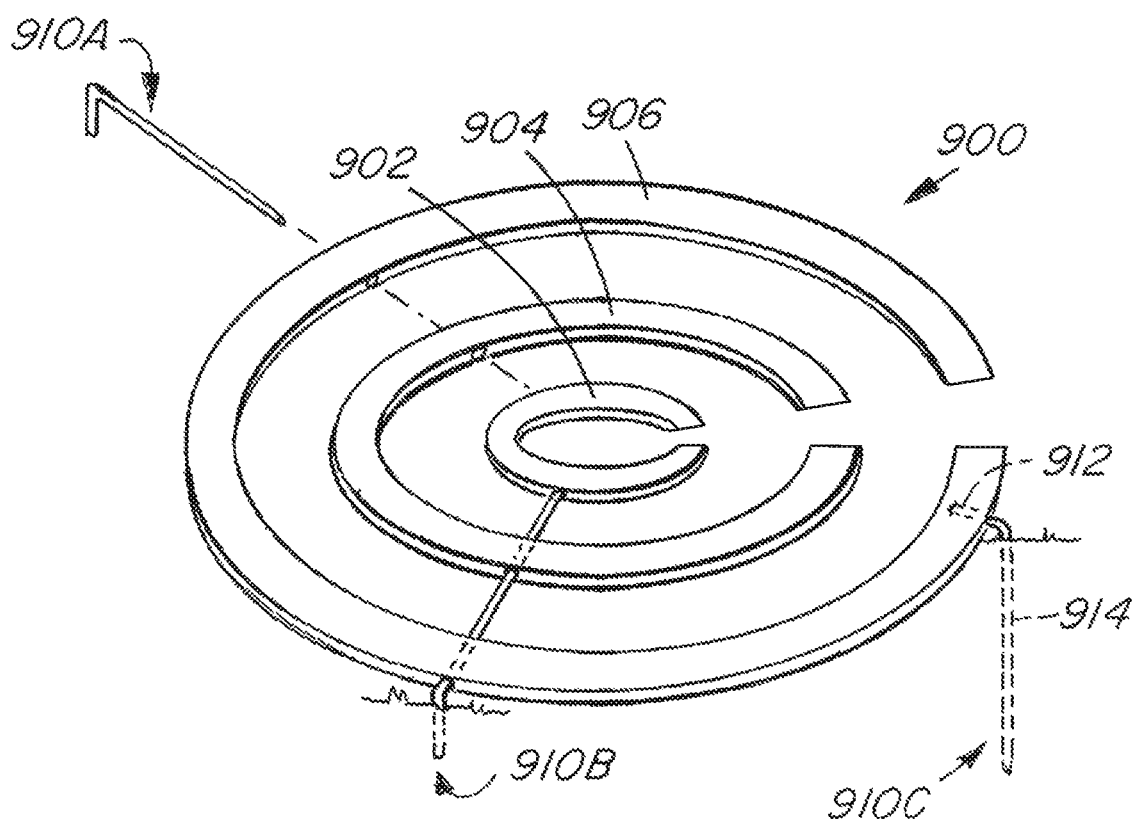
FIG. 10*a* shows bracing members in accordance with another embodiment.

In embodiments, a bracing member comprises a plurality of support rod fasteners at various distances from each other on the bracing member. While the illustrated embodiments comprise bracing members that are generally circular hoops, the term bracing member is not limited to circular or substantially circular shapes and includes all manner of closed shapes and by way of example and not of limitation, in particular variant embodiments a bracing member is a circle, an oval, a square, a rectangle, a triangle, pentagon, hexagon, heptagon, octagon, nonagon, decagon or any other suitable shape, which shape may have a closed perimeter as exemplified in FIG. 10 or open perimeter as exemplified in FIG. 10a, all of which shapes will be readily identified by those skilled in the art. In alternative embodiments a bracing member is a bracing bar as defined herein. It will be understood that the term hoop as used herein is to be understood broadly and is not limited to exactly circular shapes and includes a range of shapes that approximate a circle or that substantially enclose a space. In particular embodiments hereof, bracing members are hoops or circles but it will be understood that such circular embodiments are illustrative and not limiting of a range of possible shapes of bracing members. In embodiments, bracing members is made of or may comprise any suitable materials and in embodiments may comprise one or more of plastic, resin, fiberglass, metal and any other suitable materials, all of which will be readily identified and implemented by those skilled in the art. The drawings show embodiments of bracing members and embodiments of the use of bracing members to form support frames.

Figure 6A:
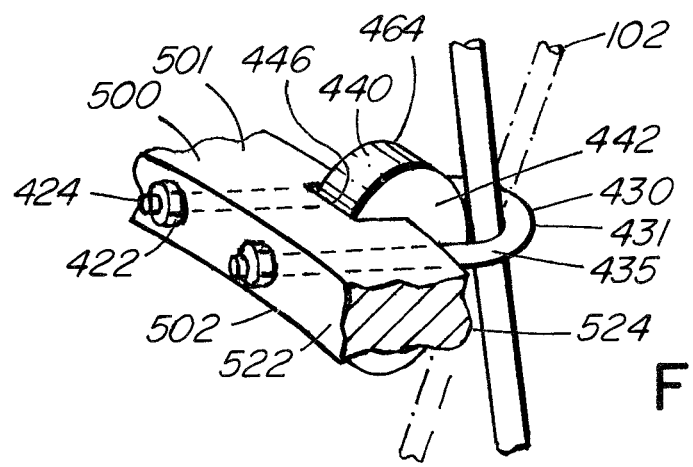
FIG. 6A shows a modified U-bolt assembly for securing a bracing member to a supporting rod.
Figure 6B:
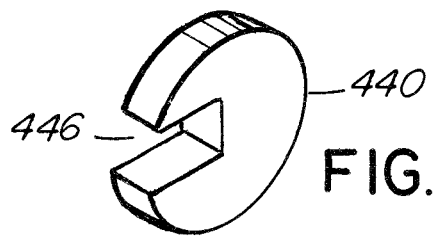
FIG. 6B shows an edge adaptor according to FIG. 6A.

In this disclosure the term "edge adaptor" refers to a structure whose purpose is to adjust the presented surface of a ring so that the relative orientation of a bracing member edge and a cooperating rod can be more conveniently adjusted. One embodiment of an edge adaptor and its use is shown in FIG. 6.

Figure 4:
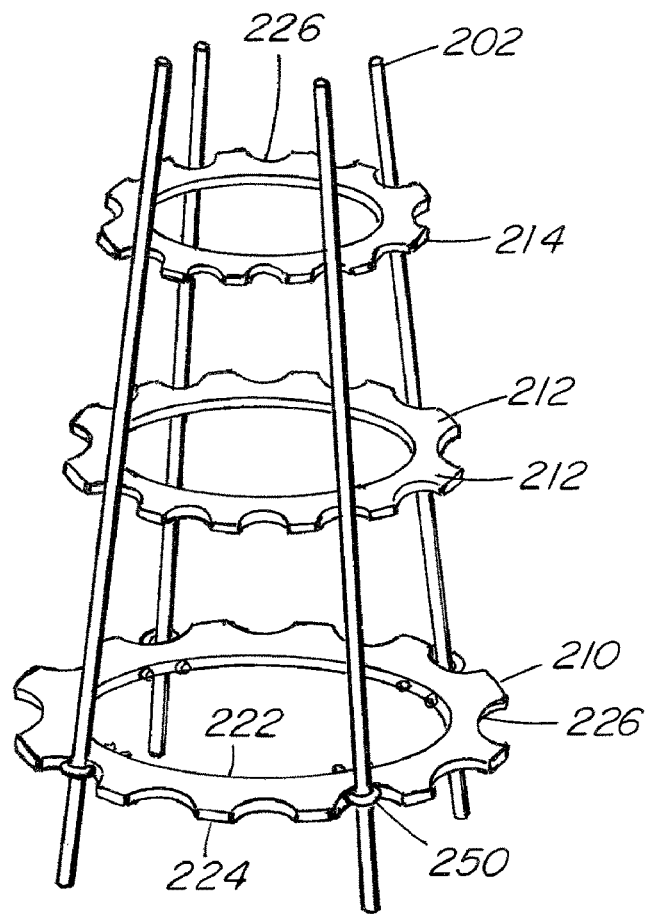
FIG. 4 shows a modification of the embodiment according to FIG. 1 wherein the bracing members comprise recessed areas.

In this disclosure, the term "support frame", also referred to as a "support cage" or as a cage or a frame, means a structure for supporting parts of a plant and may comprise frames, grids and all manner and arrangements of frames, selected examples of which are illustrated in the drawings but are in no way limiting. In particular embodiments a frame comprises supporting rods and cooperating bracing members and in embodiments these are hoops and in embodiments are other shapes. Thus in embodiments the bracing members are polygons or are any other shape, non-limiting examples including triangles, squares, pentagons, hexagons, ovals and all other suitable closed shapes, which will be readily identified and used by those skilled in the art. In alternative embodiments a bracing member is a bracing bar as defined herein. In particular embodiments a frame forms an enclosure and is able to enclose or encircle or partly enclose or encircle a plant. In embodiments portions of the plant may contact or rest on the structure while still allowing the plant to grow therethrough, in the embodiments disclosed herein a support frame is formed by the assembly of support rods and bracing members. In the illustrated embodiments a support frame is intended to enclose a plant and it is placed around, or beside the plant to provide support or guide the plant's growth or to provide additional support for a fruiting plant. In embodiments a support frame is formed by cooperating hoops and support rods, and in embodiments the hoops are configured to form a tapering structure, said tapering structure having, in embodiments, a larger diameter at the bottom than the top or vice versa. In embodiments, a support frame is covered with protective or insulating or other materials or with netting. Thus in embodiments a frame comprises a plurality of hoops each having different diameters to that the frame assembled from the hoops is tapered. In alternative embodiments some or all of the plurality of hoops are substantially the same size so that an assembled frame is not substantially tapered. In embodiments combinations of hoop sizes are used to achieve a desired shape. In embodiments a frame comprises at least 2, 3, 4, 5, 6, 7, 8, 9, 10 or more support rods. In embodiments, a support frame is covered with net, fabric or plastic sheet. In a series of embodiments a support frame is useable to form a pedestal for plant containers, by resting the container on the top bracing ring, or if the orientation of the tapering frame is reversed, then it may be used to form a hanging frame, with a plant container resting inside the inverted cone shaped frame rather than outside the frame. In embodiments a support frame is a support frame for a tomato plant. FIGS. 1 and 4 show assembled tapered support frames according to embodiments.

Figure 9:
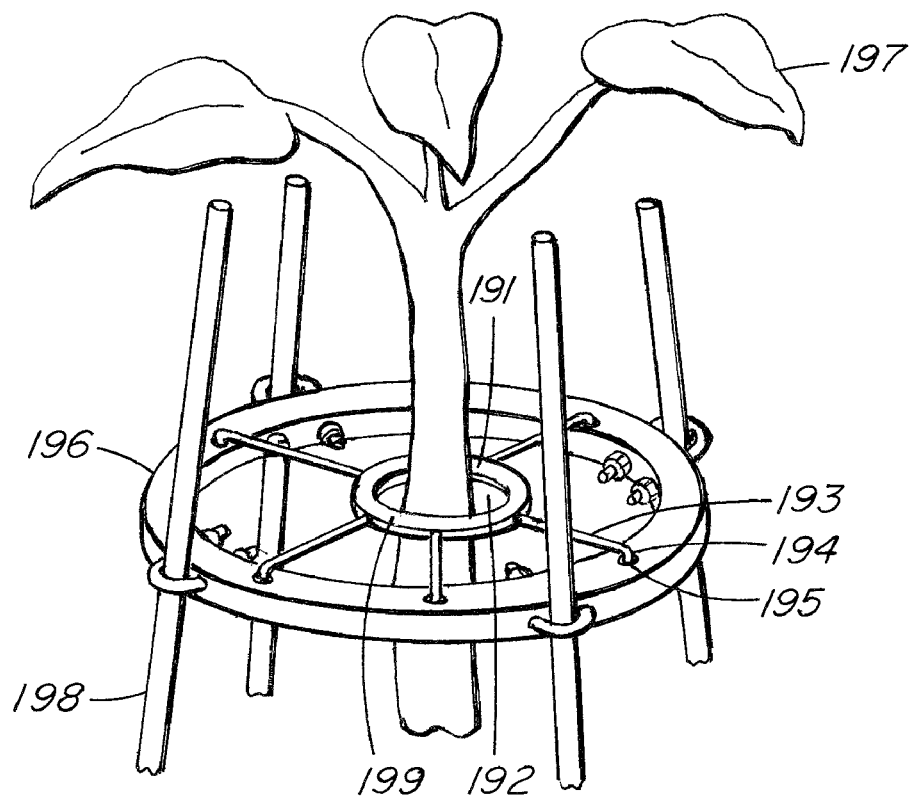
FIG. 9 shows a brace according to an embodiment for holding a frame relative to a structure.

In this disclosure the term "brace" refers to a structure intended to secure a frame or a hoop relative to some other fixed structure. An example of an embodiment of a brace is shown in FIG. 9.

Figure 7:
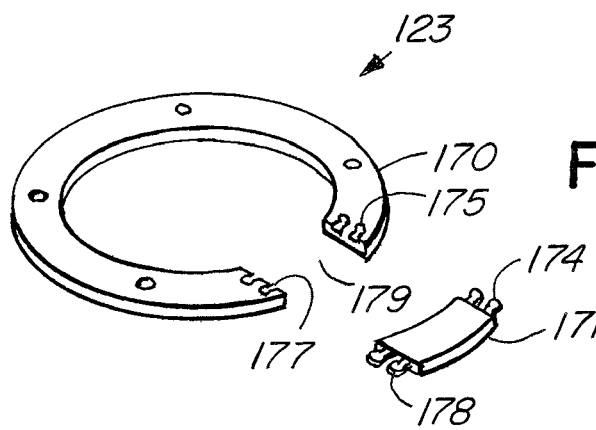
FIG. 7 shows an alternative embodiment of a bracing member, comprising a removable bracing member segment.

In this disclosure the term "removable segment" refers to a segment of a hoop which is optionally removed from the hoop to thereby create a gap in the hoop suitable to allow a structure such as a plant stem or branch to pass through the perimeter of the hoop. It will be understood that in embodiments a removable segment may in fact be permanently secured to the remaining portion of the hoop at one end and may in such cases merely be pivoted to allow a structure to pass through the hoop perimeter. It will be understood that such a removable segment and the corresponding free end or ends of the remaining hoop segment will, in embodiments, be adapted to allow mutual relative securement, which is permanent or is optional or reversible. It will be understood that the mutual relative securing of opposed free hoop segment ends will be adapted as necessary or desirable to allow them to be conveniently mutually secured, and may for example comprise cooperating clips, hooks and loops, Velcro portions, projections and receiving openings, tongue and groove, adhesive or the like. It will be understood that in embodiments a removable segment is completely detached from the hoop and is adapted to be optionally detached and reattached. FIG. 7 shows an embodiment of a hoop having a removable segment and the use of such a hoop.

It will be understood that in this disclosure all terms are to be understood as qualified by the term "substantially" to the extent that this is compatible with their function. By way of example the recitation that a structure is "rigid" is to be understood as meaning that the structure is substantially rigid and that some limited degree of flexibility is permitted consistent with the function of the structure, as will be readily understood by one skilled in the art.

The following embodiments are given by way of illustration only. It is not intended that the scope of the subject matter of this disclosure be limited to the details of construction and arrangement of the components set forth in the following embodiments or illustrated in the drawings. Particular embodiments of the subject matter hereof are now described with general reference to FIGS. 1 through 10.

DESCRIPTION OF EMBODIMENTS

First Embodiment

In a first embodiment, described with particular reference to FIGS. 1 through 7, FIG. 9 and FIG. 10, there is provided a bracing member used to form a plant support frame, a plant support frame comprising the hoop and methods for forming a plant support frame. In embodiments the frame comprises two or more or three or more bracing members and two or more or three or more support rods. In embodiments the frame comprises at least three support rods. In embodiments the frame comprises three or more bracing members. In embodiments the frame comprises at least three support rods and at least three bracing members. In alternative embodiments two or more or three or more of the bracing members are of the same or similar sizes and in further alternative embodiments two or more or three or more of the bracing members are of different sizes. One illustrative embodiment of the first embodiment is generally designated 10 and is shown in FIG. 1. This first embodiment comprises a plurality of support rods 102 each having a top end 104 and a bottom end 106, and comprising a series of bracing members 110, 112, 114 each having an internal face 122 and an external face 124. The frame 10 is generally configured so that it can enclose a plant 20 requiring support. It will be understood that in particular applications it may be desirable to prepare the frame in advance of growth of the plant.

It will be seen that the illustrated embodiment comprises three bracing members 110,112,114 and four support rods 102 but those skilled in the art will immediately understand that any suitable number of bracing members and rods may be used. In practice it has been found that in order to minimise material usage while achieving the desired result of a stable frame, the most efficient assembly comprises three bracing members and three or four support rods spaced substantially evenly about the circumference of the bracing members. It will be understood that in alternative embodiments the individual ones of the rods are positioned inside the hoops, or on the outside of the hoops, or pass through the hoops.

In embodiments suitable support rod fasteners are provided to secure the rods 104 to the cooperating bracing members. In the embodiment fasteners 129 are provided to secure the rods to the hoops and in the illustrated embodiment of FIG. 1 the fasteners are U-bolts.

Figure 3A:
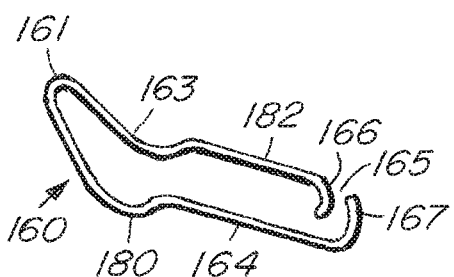
FIG. 3A shows an embodiment of a fastener comprising wire clip for the mutual securing of rods and bracing members according to an embodiment.
Figure 3B:
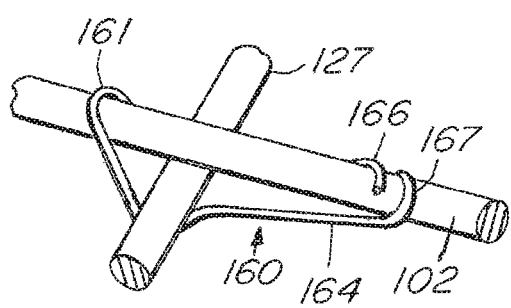
FIG. 3B shows the use of two wire clips according to FIG. 3A to mutually secure a rod and bracing member.
Figure 5:
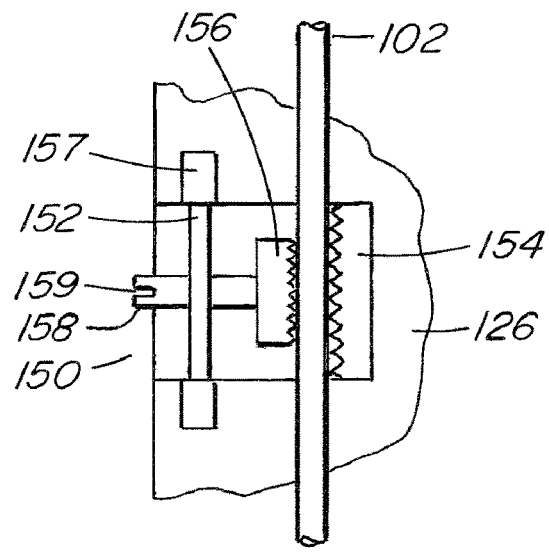
FIG. 5 shows a cross section of an embodiment of a clamp assembly embodiment for securing a bracing member to a supporting rod.

In embodiments the securing fasteners comprise U-bolts as shown in FIGS. 1, 2, 4 and 7, or comprise clamps as shown in FIG. 5, or comprise spring clips as shown in FIGS. 3 A and 3B. A variety of alternative forms of securing fastener will be readily identified and implemented by those skilled in the art.

It will be understood that the detailed structure of the bracing members may be varied in a variety of respects. Such hoops may be flattened vertically, or may have a cross section that is square, rectangular, circular, oval or any other shape that is consistent with function. In the illustrated embodiment of the first embodiment 10, it will be seen that the bracing members are generally flattened and that the support rods 102 are arranged around the outer periphery 124 of the bracing members. The hoops are secured to the cooperating support rods by means of U-bolts 130, whose use is illustrated in detail in FIG. 4, which shows greater detail of a portion of FIG. 1. As shown in FIG. 4, in use, a U-bolt 130 encloses a support rod 102 at its closed end 131, and the arms 135 having free ends 134 of the U-bolt project through a hoop, such as hoop 114 on its inner face 122, where they are secured by nuts 132 to thereby mutually secure rod 102 and hoop 114 against relative motion. While the accompanying plant is omitted for simplicity, in use, the frame according to FIG. 4 may be positioned around a plant as is shown in FIG. 1.

FIG. 6 illustrates an embodiment of an edge adaptor for use with a U-bolt fastener. In FIG. 6 a U bolt 430 comprises an outer closed end 431 comprises and arms 435 which project through hoop 500, and free ends 424 are secured by nuts 422 on inside face 522 of the hoop 500. The exterior periphery 524 of the hoop 500 is substantially flat. In order to allow support rod 102 to more easily adapt to a suitable position to span multiple bracing members, an adaptor 440 is essentially a disc with a missing segment 446 sized and shaped to fit around edge 524 and top and bottom surfaces 501, 502, of hoop 500. It will be seen that rod 102 is held against curved outer surface 44 of adapter 440 when U-bolt 430 is tightened up. Because surface 441 is curved, the angle between rod 102 and hoop 500 can be easily adjusted.

Referring again to embodiment 10 if hoops 110, 112, 114 are of only slightly different sizes then rods 102 will define an angle of only slightly greater than 90° between the rod and the plane of the hoop. On the other hand if hoops 110, 112, 114 are of greatly differing size then the angle between rods and their support rods will be far from perpendicular. The use of an adaptor 440 will make it easier for the angle to be adjusted without damage to the rods and/or the hoops. Those skilled in the art will recognise a variety of other forms of attachment that may be used to mutually secure rods and rods.

Thus, in broad aspect a hoop for forming a plant support frame comprises openings to accept a plurality of cooperating fasteners. In embodiments a hoop comprises an optionally removable segment, one embodiment of which is illustrated in FIG. 7 and is further explained below. In embodiments the fasteners are clamps. In embodiments the clamp surfaces are able to adopt an angle of between about 5 degrees and 85 degrees to the plane of the hoop.

In embodiments the hoop further comprises a plurality of radially oriented holes extending through the body of the hoop.

It will be understood that the relative size and number of hoops and support rods will be chosen by a user to provide a support frame having the desired dimensions and shape. Thus if a tall narrow tapered support frame is desired a series of hoops having only slightly differing diameters will be selected and if a wide squat tapered support frame is required then the bracing members will have substantially different diameters. If desired then a frame can be assembled using bracing members having substantially similar diameters so that the frame itself is not tapered. Using suitable numbers and sizes of bracing members it will be understood that frames having different shapes can be assembled in ways readily understood by those skilled in the art. Likewise for larger bracing members or more sturdy construction a user may choose to incorporate more bracing members, or more rods, or more bracing members and more rods. Suitable construction materials will likewise be selected for particular applications, so that a support frame intended to support a greater weight of plant material may be constructed from metal or carbon fiber or otherwise strengthened, and a frame intended only to support relatively light weights may use much lighter materials. Those skilled in the art will readily select different materials and geometries to suit particular requirements.

FIG. 5 shows in cross section a further alternative form of securing device or fastener generally designated 150 for securing a rod 102 relative to a bracing member 126. It will be seen that device 150 is embedded in or fitted into a recess in bracing member 126. It comprises a securing plate 152, and two opposed clamping plates 154 and 156. Securing plate 152 is secured or embedded at its ends 157 in the material of bracing member 126 or is otherwise secured relative to the bracing member. Clamping plate 156 is mounted on the end of screw 158 so that when screw 158 is tightened using slot 159 then plates 156 and 154 are forced towards each other and secure a rod 104 inserted therethrough. One or both of plates 154 and 156 may be mounted on a moveable mounting to more easily accommodate different angles of insertion of rod 102. Suitable mountings will be readily understood by those in the art to include a simple ball and socket joint, a hinge, or any other construction allowing the orientation of the clamping surface to adjust to match the structure clamped therethrough. In embodiments the fastener assembly may be formed into or integral to the bracing member and in alternative embodiments may be a separate structure that can be inserted into a suitably adapted receiving bracing member when desired. In embodiments the clamping plates or clamping surfaces are able to adjust to adopt an angle of between about 5 and about 85 degrees to the plane of the bracing member. In embodiments the angle is between about 10 and about 80 degrees. In embodiments the angle is between about 15 and about 75 degrees in embodiments the angle is between about 20 and about 70 degrees. In embodiments the angle is between about 35 and about 65 degrees. In embodiments the angle is between about 45 and about 90 degrees or between about 45 degrees and about 85 degrees or between about 50 degrees and about 85 degrees. In embodiments the clamping plates 156 and 154 are at a fixed angle, and the angle is the same in each bracing member of a set, so that inserted support rods fit snugly and securely and in proper alignment as they extend through the clamps in each successive bracing member of a set.

It will be understood that in embodiments comprising clamps according to FIG. 5, then the rods 102 may effectively pass through the bracing member rather than being secured on the outside periphery of the bracing member. FIG. 7 shows a possible arrangement of holes 181 in a bracing member 128, configured to receive the insertion of suitably sized rods.

FIG. 3 shows an alternative means or fastener for mutually securing a bracing member 127 and rod 102. In this alternative embodiment a clip generally designated 160 comprises ends 161 and 162, a straight portion 164 and a curved portion 163, and limbs 182, 180. In the illustrated embodiment end 162 forms a spring clip which can be opened and closed by adjusting the gap 165 between the free ends 166, 167 of the longer and shorter limbs. The clip 160 is configured to enclose and secure an adjacent perpendicular bracing member 127 when the ends of the clip 160 is suitably positioned around a rod 102. It will be seen that in an alternative arrangement the ends of the clip may engage a bracing member and the curved portion of the clip may engage a rod. Thus the two components of a joint formed by a clip will be approximately perpendicular to each other. A variety of shapes and design variants of such a clip and corresponding adaptations and geometries for bracing members and rods will be readily envisaged and implemented by those skilled in the art. It will be understood that a bracing member or rod may be adapted to more effectively engage a clip 160 and a variety of design adjustments to the clip, bracing member and rod will be readily understood and implemented by those skilled in the art.

Referring again to FIG. 1, it will be understood that in refinements of the frame 10 according to this and other embodiments, additional struts may be incorporated to allow the frame to be secured around a central structure, and additional structures such as hooks, nets, meshes, grills, and bracing or support structures can be incorporated into a support frame, as may be desired by those skilled in the art. Where desired the top of a support frame may closed to provide apical structure by extending flexible or pre shaped rods across the top bracing member It will be understood that when not assembled into a support frame, a set of bracing members such as bracing members 114, 112, 110 illustrated in FIG. 1, or 210, 212, 214 shown in FIG. 4, may be conveniently stored and/or transported in a flat concentric arrangement as is generally shown in FIG. 10. In the embodiment shown in FIG. 10 a set of three generally concentrically arrange bracing members is generally designated 900, and comprises three bracing members 902, 904, 906. For storage the bracing members are laid in generally concentric manner on a surface. Pins 910, are essentially bent rods comprising a long arm 914 and a shorter top portion 912. To secure the bracing members the long arms 914 of the bracing members are inserted through aligned holes in the three bracing members as shown by 910A and 910B. Thus the concentrically arranged bracing members can be secured for convenient storage and carriage. It will be understood that bracing member sets will be provided with suitably sized and positioned holes. Optionally pins 910 may also or alternatively be used or useable to secure an assembled support frame to a substrate, as illustrate by pin 910C, the short top portion 912 of the pin is inserted into a radial hole in the desired bottom ring of a cage assembly and the longer arm 914 is positioned in the substrate. With the bottom ring of a cage secured to the substrate, the remainder of the cage is thus stabilised. Thus in embodiments the internal and external diameters of the bracing members of a set will be chosen to permit concentric arrangement of the bracing members and in embodiments suitably sized anchor pins or pegs will be provided.

In one variant embodiment generally illustrated in FIG. 7, a bracing member generally designated 128 comprises a body 170, and one or more optionally removable bracing member segments 171. The removable bracing member segment 171 has free ends 174 and the remaining body 170 of the bracing member has free 175. The ends of the body 170 and removable segment 171 are mutually engageable or securable. In the illustrated form ends 175 of the main portion 170 of the bracing member comprise recesses 177 sized and shaped to accept projections 178 on ends 174 of removable bracing member segment 171. When the bracing member is opened a gap 179 is created in the perimeter to allow the larger bracing member segment 170 to be placed around the stem of an existing plant that it is desired to enclose and support. With the larger bracing member segment in place, the smaller segment 171 can be reattached, and with a desired number of bracing members in place these can be fastened to a desired number of support rods to thereby form a frame around the plant. A wide variety of other means to reversibly secure the bracing member segments 170, 171 will be readily understood and implemented by those skilled in the art. It will be understood that the ability to remove a section 171 of a bracing member or of a plurality of bracing members, allows easier access to the volume enclosed by a frame, and permits a frame to be assembled around a pre-existing structure (such as a young tree, a rod or other structure). It will be understood that while FIG. 7 does not show fasteners, this is purely for simplicity of illustration and those skilled in the art will immediately understand how U-bolts, clips and other types of fastener may be incorporated into or used with the bracing member of FIG. 7. Not only does the embodiment of FIG. 7 allow a frame to conveniently be positioned around an existing plant, it facilitates the sequential adjustment of a frame by periodically increasing bracing member sized to keep pace with any change in girth of an enclosed plant.

It will be understood by those skilled in the art that assembling a frame comprises positioning supporting rods and bracing members in suitable arrangement and then securing the bracing members in place on the rods using the securing fasteners. In particular applications it may be preferred to assemble a series of rods around a single bracing member and then add additional bracing members as desired. In other applications it may be preferable to assemble the components in a different sequence.

The particular sequence of arrangement of components and securing of components will vary from one application and situation to another in ways that will be readily identified and chosen amongst by those skilled in the art. In embodiments those skilled in the art will identify and implement alternative fastener types to suit particular purposes.

Thus more broadly there is disclosed a plant support frame comprising at least first and second support bracing members and a plurality of support rods secured to the bracing members, the first and second support bracing members having different bracing member diameters. In embodiments the support frame comprises a third bracing member having a different bracing member diameter from the first and second bracing members. In embodiments the support frame comprises a fastener extending at least partly through the body of a bracing member.

In embodiments the fastener is a screw clamp adapted to accept a rod at an angle of between about 5 degrees and about 85 degrees to the plane of said bracing member. In embodiments the support rods and the bracing members are mutually secured by fasteners and wherein a plurality of said fasteners comprises U bolts.

In a variant series of embodiments there are also provided bracing bars, one embodiment of which is shown in FIG. 8 and generally designated 30 and there are disclosed methods for forming a plant support frame by securing one or more bracing bars or bracing members with cooperating support rods. It will be seen that the bar 30 comprises a shaft 310 having end recesses 320 adapted to accept insertion of U bolts 322. With a rod 104 enclosed by the closed end 331 of a U-bolt the U bolt may be tightened and held in place by nuts 324 applied to its free ends 323, that the bar 30 and a rod 102 are secured relative to each other. Thus by assembling a plurality of bars 310 and rods 102 in interconnected fashion, a frame may be erected. It will be understood that by varying angles, sizes and distances of the components, the shape and properties of an assembled frame may be readily adjusted as desired by one skilled in the art. Thus a frame may be generally planar or may be curved to cover a desired surface. Similarly by suitable positioning of bars and rods extensions may be made to an existing support frame.

It will be understood that in use it may be desired to stabilise an assembled frame with guy ropes or struts of various designs. A wide variety of options for anchoring and stabilising an assembled frame will be readily identified and implemented by those skilled in the art.

While in the illustrated embodiment recesses 320 at opposite ends of the bar 310 are on opposite sides of the bar, in alternative embodiments they may be on the same side. It will be understood that the various methods for securing a stabilising bracing member and cooperating support rod described with reference to the first embodiment may also be adapted for use with variants of the third embodiment. All such adaptations will be readily understood and implemented by those skilled in the art.

In variant embodiments generally designated 20 and illustrated in FIG. 4, bracing members 201, 212, 214 are supported on rods 202. The bracing members have an inner edge 222 and an outer edge 224. The outer edge 224 of a bracing member comprises recessed portions 226 which accept the positioning therethrough of the supporting rods or other structures, and are separated by projecting portions 210. In variants of this embodiment the outer margin 224 of one or more of the bracing members may be modified in a variety of other ways to suit the requirements of a user. Fasteners 250 are provided to secure the rods 102 and the bracing members against relative movement. It will be understood that the size and shape of recesses 226 may be adjusted in a variety of ways both for aesthetic reasons and to accept suitably sized rods.

It will be understood that with suitable adaptations the various securing means described with reference to the first embodiment may be adapted for use with the second embodiment. Those skilled in the art will readily recognise and implement all such necessary or desirable adaptations.

In embodiments a frame also comprises a brace to hold a bracing member or frame relative to a fixed support such as a tree, plant or central rod. One embodiment of such a brace is shown in FIG. 9 and is generally designated 199. It comprises a central bracing member 191 defining a hole 192 and surrounded by radiating bars 193 with hooks or projections 194 at their ends. In this embodiment the projections 194 are intended to engage holes 195 in a suitably sized bracing member 196. Thus the brace 199 serves to hold a frame generally designated 198 in position around a central structure 197, which may be a plant or any other suitably sized and shaped object. In embodiments the brace also serves to guide the growth of a central plant by preventing it from leaning excessively to one side or growing away from the vertical. It will be understood that a wide variety of other methods and structures to attach such a brace to a bracing member or frame will be readily understood by those skilled in the art and that a wide variety of braces are possible and suitable for particular purposes. It will also be understood that where a ring is provided as shown in the embodiment of FIG. 9, the ring may be adapted to allow the brace to be positioned around a pre-existing support such as a tree. It will be further understood that in embodiments the central ring 191 will be adapted to allow the ring to be opened and closed, so that it can be positioned around a pre-existing support where the ring cannot be simply slipped down from the top of the central support.

Second Embodiment

In a second series of embodiments there is provided a kit for assembly a plant support frame. In embodiments the kit comprises at least first and second support bracing members, each first and second support bracing members having a different diameter. In embodiments the kit further comprises a third support bracing member. It will be understood that in embodiments the bracing members are sized so that the first bracing member fits within the second bracing member, and the second bracing member fits within the third bracing member, and that some or all of the bracing members may be concentrically arranged. In embodiments, the bracing members are adapted to be mutually secured in the foregoing concentric arrangement.

One example of the embodiment is generally illustrated in FIG. 10 wherein 10 a set of three generally concentrically arrange bracing members is generally designated 900, and comprises three bracing members 902, 904, 906. For storage the bracing members are laid in generally concentric manner on a surface. Pins 910, are essentially bent rods comprising a long arm 914 and a shorter top portion 912. To secure the bracing members the long arms 914 of the bracing members are inserted through aligned holes in the three bracing members as shown by 910A and 910B. Thus the concentrically arranged bracing members can be secured for convenient storage and carriage. It will be understood that bracing member sets will be provided with suitably sized and positioned holes. Optionally pins 910 may also or alternatively be used or useable to secure an assembled support frame to a substrate, as illustrate by pin 910C, the short top portion 912 of the pin is inserted into a radial hole in the desired bottom ring of a cage assembly and the longer arm 914 is positioned in the substrate. With the bottom ring of a cage secured to the substrate, the remainder of the cage is thus stabilised. Thus in embodiments the internal and external diameters of the bracing members of a set will be chosen to permit concentric arrangement of the bracing members and in embodiments anchor pins or pegs will be provided.

In embodiments of a kit, at least one supporting bracing member is adapted to accept a plurality of cooperating rod fasteners. In embodiments at least one of the bracing members comprises a removable segment. In embodiments at least one of the rod fasteners is mounted in the body of said supporting bracing member. In embodiments the kit comprises fasteners selected from the group consisting of clips and U-bolts, for attaching the bracing members to rods.

In embodiments a rod fastener comprises a rod gripping surface able to adopt an angle of between about 5 degrees and about 85 degrees to the plane of the bracing member. In embodiments the kit comprises a least one anchor pin and at least one bracing member comprises a plurality of radial holes sized to accept radial insertion of said at least one anchor pin.

In embodiments a bracing member comprises circumferentially spaced radial holes and the spacing is such that when the bracing members are arranged concentrically, then a plurality of said radial holes in an inner bracing member are aligned with a corresponding plurality of radial holes in an outer bracing member so that a plurality of anchor pins of suitable length are insertable through the aligned holes to thereby mutually secure the bracing members.

In embodiments the kit comprises a plurality of cooperating fasteners. In embodiments each bracing member has an outer periphery and the outer periphery comprises a plurality of rod receiving recesses.

In embodiments a kit comprises a plurality of support rods. In embodiments a kit does not comprise rods and a user may freely assemble bracing members with any desired rods.

Generally particular embodiments of kits comprise the features and components of any of the other embodiments. Those skilled in the art will readily select particular features of the embodiments and adapt and implement them as necessary or desirable for particular purposes.

The embodiments and examples presented herein are illustrative of the general nature of the subject matter claimed and are not limiting. It will be understood by those skilled in the art how these embodiments can be readily modified and/or adapted for various applications and in various ways without departing from the spirit and scope of the subject matter disclosed and claimed. The claims hereof are to be understood to include without limitation all alternative embodiments and equivalents of the subject matter hereof. Phrases, words and terms employed herein are illustrative and are not limiting. Where permissible by law, all references cited herein are incorporated by reference in their entirety. It will be appreciated that any aspects of the different embodiments disclosed herein may be combined in a range of possible alternative embodiments, and alternative combinations of features, all of which varied combinations of features are to be understood to form a part of the subject matter claimed. Particular embodiments may alternatively comprise or consist of or exclude any one or more of the elements disclosed.

The embodiments of the invention in which an exclusive property or privilege is claimed are defined as follows:

1. A plant support frame comprising first and second bracing members and first and second support rods; each bracing member comprising:
   a body portion defining a perimeter;
   an opening provided within said body portion and being surrounded by said perimeter; said opening being sized and dimensioned to receive a plant there through; and
   a plurality of radially oriented circumferential holes extending through the body portion, said holes being sized to accept a cooperating fastener for selectively securing a corresponding one of the support rods to an external circumference of the bracing member or an internal circumference of the bracing member, for forming the plant support frame when in a working configuration;
   the plant support frame further comprising anchor pins for assembling the plant support frame in a storage configuration, wherein when the plant support frame is in the storage configuration, the anchor pins are inserted through the bracing members, thereby storing the bracing members together;
   wherein a spacing between the circumferential holes follows a pattern according to which, when the plant support frame is in the storage configuration, the circumferential holes of an inner one of the bracing members are aligned with the circumferential holes of an outer one of the bracing members and the inner one of the bracing members and the outer one of the bracing members are arranged concentrically, for securing the first bracing member and the second bracing member together using the anchor pins, each of the anchor pins being inserted through the aligned circumferential holes of every bracing member thereby storing the bracing members in a flat concentric arrangement.

2. The support frame according to claim 1 further comprising a third bracing member.

3. The support frame according to claim 2 wherein each of said first, second and third bracing members have different diameters.

4. The support frame according to claim 1 wherein said bracing members are secured to said rods by fasteners defining U-bolts.

5. The support frame according to claim 1 wherein at least one of said bracing members comprises an optionally removable segment.

6. The plant support frame of claim 1, wherein at least one of the first and second bracing members is planar.

7. The plant support frame of claim 1, wherein the radially oriented circumferential holes are oriented horizontally.

8. A plant support frame comprising at least first, second and third bracing members, at least two support rods, and a plurality of fasteners for optionally fastening the at least first, second and third bracing members to the rods to form the frame; each bracing member comprising:
   a body portion defining a perimeter;
   an opening provided within said body portion and being surrounded by said perimeter; said opening being sized and dimensioned to receive a plant there through; and
   a plurality of radially oriented circumferential holes extending through the body portion, said holes being sized to accept a cooperating fastener for selectively securing a corresponding support rod to an external circumference of the bracing member or an internal circumference of the bracing member, for forming the plant support frame when in a working configuration:
   the plant support frame further comprising anchor pins for assembling the plant support frame in a storage configuration, wherein when the plant support frame is in the storage configuration, the anchor pins are inserted through the bracing members, thereby storing the bracing members together;
   wherein when said frame is disassembled, the first bracing member will fit within the second bracing member, and the second bracing member will fit within the third bracing member to form a concentric arrangement of said bracing members; and
   wherein a spacing between the circumferential holes follows a pattern according to which, when the plant support frame is in the storage configuration, the circumferential holes of an inner bracing member are aligned with the circumferential holes of an outer one of the bracing members and an inner one of the bracing members and the outer one of the bracing members are arranged concentrically, for securing the first bracing member and the second bracing member together using the anchor pins, each of the anchor pins being inserted through the aligned circumferential holes of every bracing member thereby storing the bracing members in a flat concentric arrangement.

9. The plant support frame according to claim 8 wherein said bracing members are adapted to be mutually secured in said concentric arrangement.

10. The plant support frame according to claim 8 wherein the fasteners include U-bolts.

11. The plant support frame of claim 8, wherein at least one of the first, second and third bracing members is planar.

12. The plant support frame of claim 8, wherein the radially oriented circumferential holes are oriented horizontally.

13. A method for forming a plant support frame, the method comprising the steps of:
   (a) providing a plurality of support rods and anchor pins;
   (b) providing first, second and third bracing members, each bracing member comprising:
      a body portion defining a perimeter;
      an opening provided within said body portion and being surrounded by said perimeter; said opening being sized and dimensioned to receive a plant there through; and
      a plurality of radially oriented circumferential holes extending through the body portion, said holes being sized to accept a cooperating fastener for selectively securing a corresponding one of the plurality of support rods to an external circumference of the bracing member or an internal circumference of the bracing member; for forming the plant support frame in a working configuration;

wherein a spacing between the circumferential holes follows a pattern according to which, when the plant support frame is in a storage configuration, the circumferential holes of an inner one of the bracing members are aligned with the circumferential holes of an outer one of the bracing members and the inner one of the bracing members and the outer one of the bracing members are arranged concentrically;

(c) assembling the frame in the storage configuration by securing the first bracing member and the second bracing member together using the anchor pins, comprising inserting each of the anchor pins through the aligned circumferential holes of every bracing member for storing the bracing members in a flat concentric arrangement; and (d) removing each of the anchor pins and fastening said first, second and third bracing members to said support rods for assembling the frame in the working configuration.

14. The method according to claim 13 wherein said bracing members are of different diameters and the resulting plant support frame is tapered.

15. The method according to claim 13 wherein the bracing member is secured to the corresponding support rod using a friction force resulting from a pressure applied by the cooperating fastener onto a surface of contact of the bracing member with the support rod.

16. The method of claim 13, wherein at least one of the first, second and third bracing members is planar.

17. The method of claim 13, wherein the radially oriented circumferential holes are oriented horizontally.

* * * * *